Figure 1:
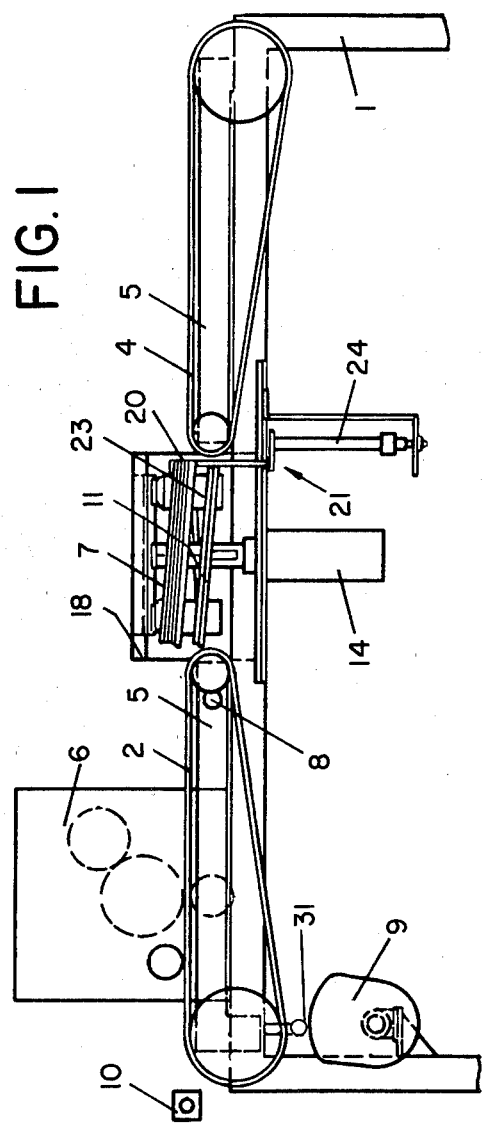

United States Patent [19]

Haas, Sr. et al.

[11] 4,361,082
[45] Nov. 30, 1982

[54] APPARATUS FOR MANUFACTURING WAFFLE BLOCKS

[76] Inventors: Franz Haas, Sr., Gerstlgasse 25, 1210 Vienna; Franz Haas, Jr., Castellezgasse 32, 1020 Vienna; Johann Haas, Wiener Strasse 209-215,, 2104 Spillern (NÖ), all of Austria

[21] Appl. No.: 206,148

[22] Filed: Nov. 12, 1980

Related U.S. Application Data

[62] Division of Ser. No. 886,402, Mar. 14, 1978, Pat. No. 4,246,290.

[30] Foreign Application Priority Data

Mar. 25, 1977 [AT] Austria .................. 2098/77

[51] Int. Cl.³ .................. A21D 13/00; A23G 3/00
[52] U.S. Cl. .................. 99/450.4; 198/625; 414/94
[58] Field of Search .................. 99/450.4, 450.5, 450.7, 99/450.1, 450.2, 443 C, 644; 426/94, 502, 103, 572, 391, 302, 808, 275, 274, 281, 283, 297, 138, 282; 198/625; 414/94, 49

[56] References Cited

U.S. PATENT DOCUMENTS 2,838,010  6/1958  Farrer .................. 99/450.4
3,712,487  1/1973  Eberle .................. 414/94
4,108,319  8/1978  Kacirek et al. .................. 198/625

FOREIGN PATENT DOCUMENTS 245514  3/1966  Austria .
610383  1/1926  France .
1099019  1/1968  United Kingdom .
1468930  3/1977  United Kingdom .

Primary Examiner—Philip R. Coe
Assistant Examiner—Timothy F. Simone
Attorney, Agent, or Firm—Schwartz, Jeffery, Schwaab, Mack, Blumenthal & Koch

[57] ABSTRACT

A process and apparatus for manufacturing waffle blocks filled with cream in which individual waffle sheets are moved on a feeder belt into contact with a coating device for coating on one side and are introduced subsequently into a stacking device where they are individually lifted by at least two oppositely mounted upright spiral feeders that grip the waffle sheets and guide them upwardly in succession against each other until a waffle block composed of a predetermined number of waffle sheets is completed. The completed waffle blocks are pushed by the spiral tracks on a run-off belt and discharged.

33 Claims, 4 Drawing Figures

APPARATUS FOR MANUFACTURING WAFFLE BLOCKS

This is a division of application Ser. No. 886,402, filed Mar. 14, 1978, U.S. Pat. No. 4,246,290.

The invention relates to an apparatus for manufacturing waffle blocks.

The known apparatus for manufacturing waffle blocks filled with cream is by means of a single cream device which is shaped as a drop shaft. The waffle block is formed on a waffle block run-off belt disposed below the drop shaft. In order to avoid that the waffle sheets tip over immediately upon entering the drop shaft and thus strike the coated waffle sheet already in place in the shaft with their edge, each waffle sheet is first deposited on several slidably mounted support elements arranged above the run-off belt in the drop shaft. These support elements must release the waffle sheet forming the waffle block before the next waffle sheet arrives. The waffle sheet must be positioned so as to be outside the path of the support elements and the latter must thereafter return into their starting position in order to receive the following waffle sheet. The released waffle sheet floats down in the drop shaft and positions itself on the run-off belt, or on the coated waffle sheets already positioned on this belt. The waffle cover sheet is brought in also in the same manner but the table of the coating device is lowered, for example, so that this waffle sheet is not coated with cream. When the waffle block is complete, the run-off belt is actuated and the waffle block removed from the drop shaft. In this respect see the disclosure of Austrian Pat. No. 245 514.

An apparatus of this type handles, depending on the size, between 1500 and 2400 waffle sheets per hour. With this type of output the period available for the removal of the waffle block from the stacking device ranges between only 2.4 and 1.5 seconds. During this short period the run-off belt must start up, guide the waffle block from the drop shaft and finally be stopped again so that it is stationary when the first waffle sheet of the following waffle block floats down. If the run-off belt is not stationary this first waffle sheet will be moved along and offset relative to the following waffle sheets of the waffle block.

The working speed of this known device is limited due to the fact that this run-off operation cannot be accelerated. In recent times automatic baking ovens have been developed whose performance is substantially greater than that of the known apparatus for manufacturing waffle blocks. In this respect there exists the problem that either the maximum output of the automatic baking oven cannot be utilized or that in order to do so it is necessary to use two known devices in parallel operation. This again requires an additional auxiliary device. It is the purpose of this invention to provide a process and apparatus for manufacturing waffle blocks in which the assembly of the waffle sheets and also the removal of the waffle block is carried out in such a way that even at the highest operating speed the block formation is not impeded by the removal of the completed waffle block.

According to the invention this is obtained in that first an uncoated waffle sheet is lifted and thereafter cream coated waffle sheets are successively pushed under this lifted waffle sheet and also lifted and thus positioned against the one or more prior waffle sheets already in position. The first uncoated waffle sheet as well as the already assembled addition waffle sheets are preferably maintained in the lifted position. The device for carrying out the invention comprises a feeder conveyor in the form of a feeder belt with a cream coating device, a run-off conveyor in the form of waffle block run-off belt provided, if appropriate, with a calibrating roll, and a stacking device disposed between these belts. The device is characterized in that the stacking device comprises two oppositely disposed vertical feeders which take hold of the waffle sheets and which are disposed adjacent the feeder belt or in its extension. It is preferable to have two oppositely mounted vertical feeders formed of counter rotating tracks having a helical form, which tracks are called spiral tracks herein formed preferably from round spring steel, wherein their average diameter corresponds approximately to the length of the waffle sheets in the feeding direction, i.e., the downstream direction of the feeder belt. In this regard it will be apparent from what follows and from the drawing, particularly FIG. 2, that the reason for two spiral tracks is that the waffle sheet generally will need support from at least two spaced-apart locations.

The apparatus for carrying out the invention makes possible a very gentle handling of the individual waffle sheets and a very exact and rapid formation of the waffle blocks. This is due primarily to the fact that the actual stacking device does not have any support elements which extend into the path of the waffle sheets and which have to be retracted to release the waffle sheets and be returned into their starting position. According to the present invention the distance between the individual waffle sheets is maintained by the vertical feeder itself. Furthermore the waffle block is not formed by a free fall of the waffle sheets on the run-off belt but by the positive transportation by means of the vertical feeders. Accordingly, the time period required therefore can be influenced also by the speed of the vertical feeders.

In the preferred device for carrying out the process according to the invention by means of spiral tracks as vertical feeders the coils of the spiral tracks take over the task of the support elements. The spiral tracks as vertical feeders present also the advantage that through their rotary movement the waffle sheets are transported not only in a vertical but also in a horizontal direction. It requires merely an abutment which prevents the horizontal transporting of the waffle sheets at which the waffle sheets may slide upwards to be assembled into a waffle block.

As soon as the abutment is removed the waffle sheet or waffle block is lifted automatically from the stacking device. This push-out movement of the spiral tracks can be improved by means of auxiliary devices in the form of guide rolls or an endless feeder belt that can be driven and which are arranged within the spiral tracks to grip the waffle sheets at the side edges. As the friction between waffle block and spiral tracks is small due to the narrow contact surface relative to the friction between the waffle block and run-off belt the latter pulls the waffle block from the stacking device as soon as it is positioned even with only a small strip on the run-off belt.

To summarize certain of the foregoing, the stacking device is disposed adjacent to and generally downstream of the feeder conveyor. The stacking device receives waffle sheets from the feeder conveyor for stacking the waffle sheets vertically, one under the other, to form a waffle block. The run-off conveyor is disposed downstream of the stacking device for receiving completed waffle blocks discharged from the stacking device and for transporting such waffle blocks away from the stacking device. The stacking device includes means for: vertically lifting a first uncoated waffle sheet, received from the feeder conveyor, above the feeder conveyor; for vertically lifting a second coated waffle sheet, received from the feeder conveyor after receipt of the first waffle sheet, above the feeder conveyor to meet the lower side of the first lifted sheet; and for vertically lifting, if additional layers are desired, additional sheets, above the feeder conveyor to meet the lower side of the last previously lifted sheet to provide a completed waffle block. The apparatus of the invention also includes means for controlling discharge of the completed waffle blocks from the stacking device.

It will be apparent that in the apparatus of the invention, the lifted wafer sheets are kept in the lifted position. That is, the individual sheets and the partial blocks, respectively, are not lowered between the individual stacking steps.

A cream coating device is disposed adjacent the feeder conveyor for coating the upper sides of certain of the waffle sheets with cream prior to entry of the waffle sheets into the stacking device. The apparatus of the invention also includes means for controlling the cream coating device to prevent coating of the first waffle sheet to be received in the stacking device for forming a given waffle block so that only the second and any subsequent waffle sheets for a given waffle block are coated.

As already indicated, the stacking device includes vertical feeders which comprise rotatable helical tracks referred to herein as spiral tracks. These spiral tracks are in the form of rod-like elements, and they provide an upward spiral movement. The spiral tracks have axes of rotation and include means for rotatably driving the same. As indicated, the spiral tracks are driven in opposite rotary directions relative to one another.

Each spiral track includes a coil with only two turns. The feeder conveyor has an upper surface on which the waffle sheets are carried, and an upper portion of each coil is disposed at a level above this upper surface. Each such upper coil portion includes between 1 and 1½ turns of the coil.

The discharge controlling means of the apparatus includes an abutment disposed immediately downstream of the stacking device to provide a stop for each waffle sheet. This stop prevents discharge of the waffle sheets from the stacking device during stacking. The abutment also provides an end guide for aligning the waffle sheets during stacking. The abutment is vertically movable between an upper discharge blocking position in which the waffle sheets in the stacking device engage the abutment and a lower discharge position in which the waffle sheets in the stacking device do not engage the abutment and in which lower position the completed waffle block is free to move downstream. The vertical movement of the abutment is over a distance corresponding to the vertical height of a completed waffle block. The abutment may also be moved into an intermediate vertical position between the upper and lower positions. In this intermediate position, the abutment blocks the discharge from the stacking device of a first waffle sheet for a new waffle block prior to complete discharge from the stacking device of a previously completed waffle block.

Accordingly the apparatus for carrying out the invention makes it possible to increase the number of waffle sheets to be treated per minute to a considerable degree relative to the known devices and to operate the production of waffle sheets of a large automatic waffle oven in a single apparatus. The apparatus for carrying out the invention furthermore has the advantage that broken-away pieces of waffle sheets do not drop, as in the known apparatus, on top of the already assembled waffle sheets from which they can no longer be removed due to the cream and thus can make the entire waffle block unsuitable, while in this invention they drop between the spiral tracks from the apparatus.

The apparatus according to the invention presents additionally the advantage that it requires very little space so that the length of an installation for manufacturing waffle blocks can be considerably reduced.

Figure 2:
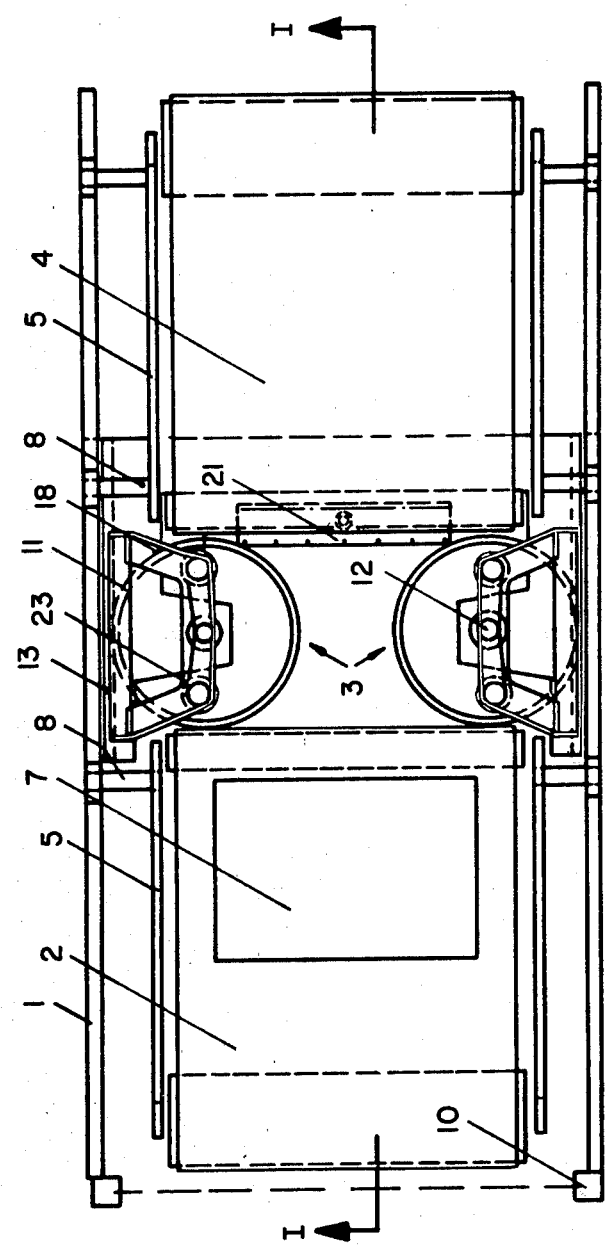
Figure 3:
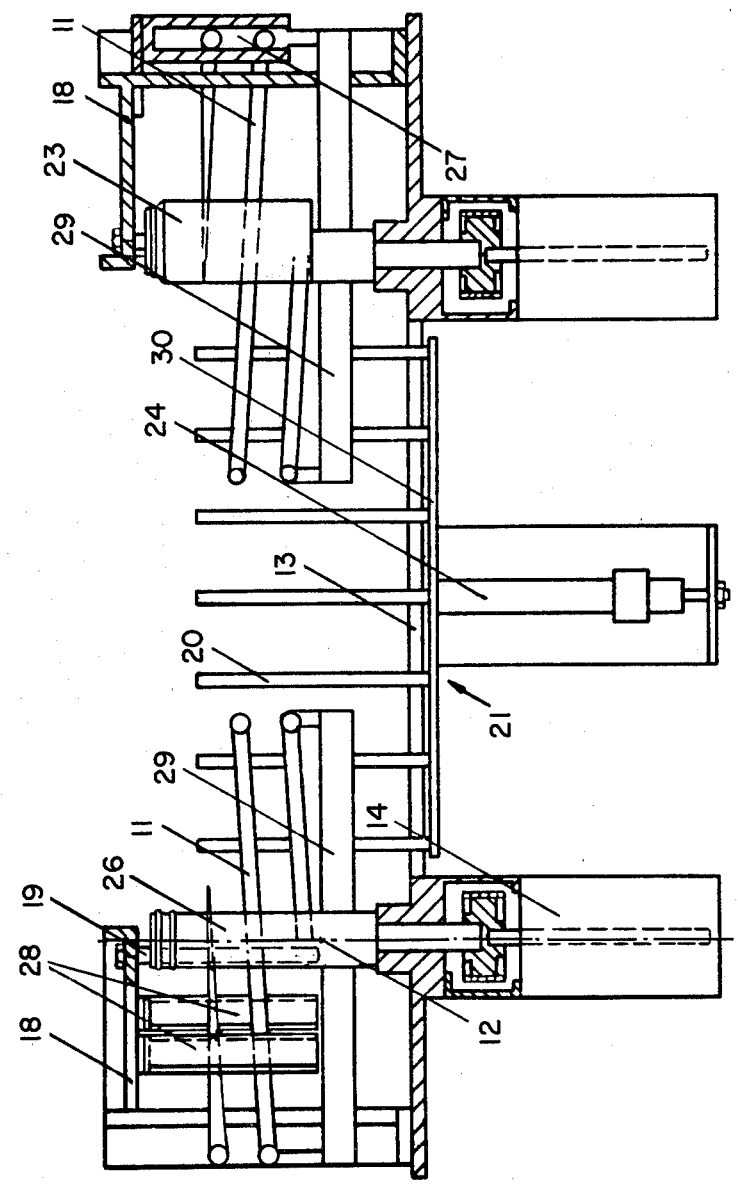
Figure 4:
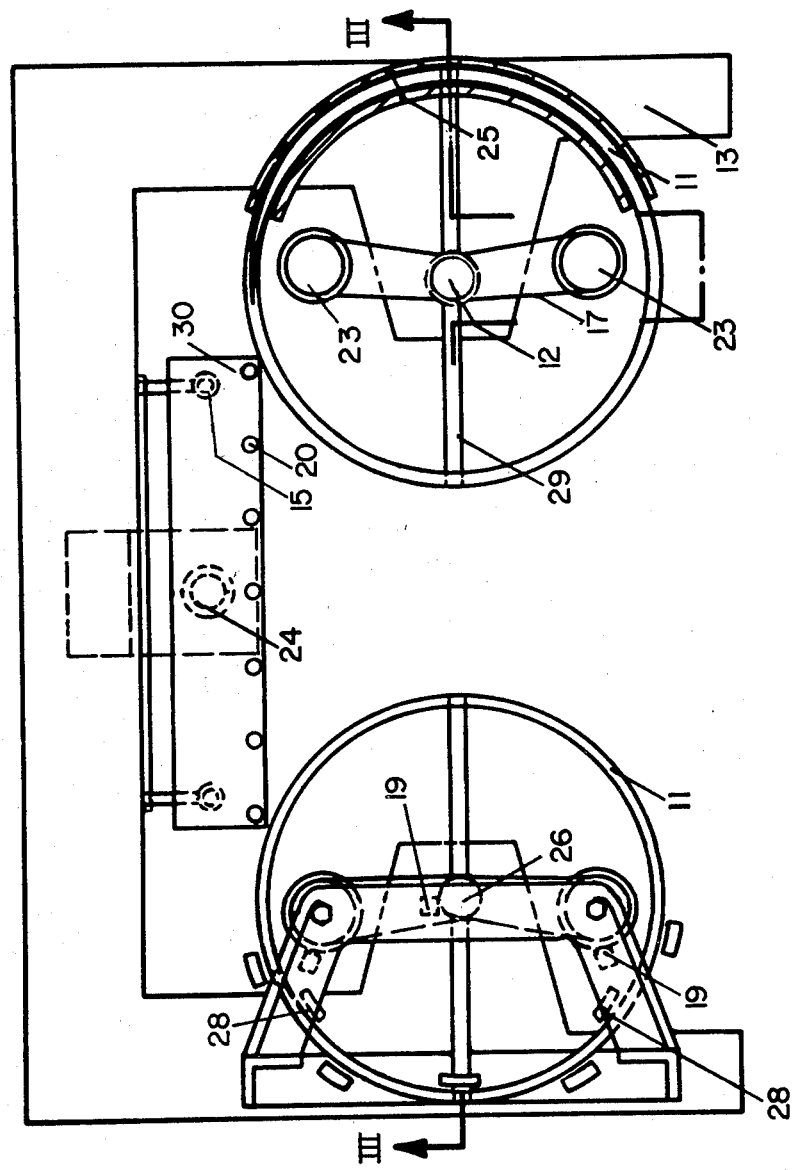

The invention will be explained in greater detail hereafter by describing an embodiment for carrying out the process of the invention illustrated in the accompanying drawings, in which:

FIG. 1 shows a section through the apparatus of the invention along line I—I of FIG. 2, FIG. 2 is a plan view of the apparatus according to FIG. 1, FIG. 3 shows a section of the stacking device along line III—III of FIG. 4, and, FIG. 4 is a plan view of the stacking device according to FIG. 3.

The apparatus of the invention consists of a frame 1 in which conveying device in the form of a feeder belt 2, a stacking device 3 and a run-off belt 4 are mounted. It will be apparent from the foregoing, from the drawing, and from what follows that the feeder belt 2 feeds unfinished waffle sheets into a stacking device, that run-off belt 4 removes the finished product from the stacking device, and that, therefore, there are two belts 2, 4. The two belts 2, 4 have each a frame 5 by which they are mounted on frame 1. Above the feeder belt 2 a conventional cream coating device 6 is secured and above the run-off belt 4, if appropriate, a calibrating roll (not shown) for the waffle block. The frame of the feeder belt 2 is pivotably mounted on a horizontal shaft 8 disposed directly in front of a stacking device 3. Accordingly it is possible to lower the feeder belt 2 in the range of the cream coating device 6 relative thereto. This is necessary in order to cover a waffle block assembled from coated waffle sheets 7 with an uncoated waffle sheet. The lowering of the frame 5 of the feeder belt 2 is obtained by a control cam 9 which is intermittently driven by a motor and which cooperates with a roll 31 extending downwardly from frame 5. In the rest position of cam 9 the feeder belt 2 is in a position necessary for the coating of the waffle sheets with cream by the cream coating device 6 as it is illustrated in FIG. 1. The lowering of the feeder belt 2 is controlled over a light gate 10 arranged in front of it and by an adjustable counting mechanism. The number of waffle sheets of a waffle block can be set at the counter mechanism. According to the process of the invention it is necessary that the first waffle sheet of each waffle block is not coated.

An essential feature of the invention resides in the stacking device 3 necessary for carrying out the process of the invention. In the embodiment illustrated in the drawings the stacking device 3 consists of two spiral feeders 11. However, this is only one of several possible solutions for carrying out the process of the invention.

In place of spiral feeders 11 one could use with the same result for example also vertically arranged feeder belts which are provided with horizontally arranged catch elements which would be designed in that case also so that they could be extended or retracted relative to the feeder belts.

It would also be possible to obtain the lifting of the waffle sheets by means of compressed air and to maintain the waffle sheets in the lifted position by creating a low pressure above the waffle sheets. In that arrangement the stacking device would consist of a shaft in whose bottom one or several outlet openings for compressed air would be provided and which would present at its front wall facing the feeder belt an entrance slot for the waffle sheets, and at the front wall facing the waffle block run-off belt a closable exit slot for the waffle block.

The stacking device 3 for carrying out the process of the invention is formed of spiral feeders 11 and consists, as shown in FIGS. 3 and 4, of two spirals formed of bent round spring steel which rotate in opposite direction and are wound contrary to the direction of rotation. The right spiral track 11 as seen in the transporting direction of the feeder belt 2 ascends in the counter clock-wise direction and rotates in the clock-wise direction. In the case of the opposite spiral track 11 it is just the reverse. It will be apparent that the waffle sheets have lateral sides running generally in a downstream direction and that the pair of spiral tracks or vertical feeders 11 are disposed adjacent each other such that, in operation, one vertical feeder is on one lateral side of a waffle sheet to be lifted and the other vertical feeder is on the other lateral side of the waffle sheet to be lifted. The diameter of the spiral tracks 11 corresponds approximately to the length of a waffle sheet 7 in the transporting direction of the belts 2 and 4, i.e., in the downstream direction. Each of the spiral tracks 11 having only two turns or windings is secured by means of a diametrical arm 29 on a shaft 26 which constitutes the rotary axis 12. The arm 29 as well as a half to a full winding of the spiral track 11 is disposed below the transporting plane, i.e., the upper surface of the feeder belt 2. When the spiral track 11 is standing still the penetration points between the transporting plane of the feeder belt 2 and the two spiral tracks 11 are disposed outside the actual stacking range and essentially in the plane determined by the rotary axes 12 of the spiral tracks 11. The distance between the rotary axes 12 of the two spiral tracks 11 corresponds to the width of a waffle sheet 7 increased by the diameter of a shaft 26. Under these conditions an optimum support of the brittle and easily breakable waffle sheet 7 is obtained.

The shafts 26 of the spiral tracks 11 are journalled at their lower end in a plate 13 secured to the frame 1 of the apparatus. Each shaft 26 is driven by a motor 14 in such an intermittant manner that the spiral tracks 11 carry out in each instance only one rotation. The regulation of the motors 14 as well as the setting of the control are such that each of the spiral tracks 11 stops always in one and the same position after a rotation. In this manner it is assured that the waffle sheets 7 entering the stacking device do not strike against the coil of the spiral tracks 11 but enter between them. As the spiral tracks 11 are driven by their own motor 14 the space below and above the stacking device is free so that waffle blocks in which faulty waffle sheets were assembled can be removed in a simple manner from the apparatus in that one strikes with the edge of the hand between the spiral tracks 11 on the waffle block, whereby it breaks apart and drops downwardly from the stacking device. For this purpose it is necessary that the gradient of the spiral tracks 11, i.e., the vertical distance between two adjacent coils thereof, corresponds to 2.5-4 times their thickness, i.e., the thickness of the rod-like elements thereof taken in the vertical direction, so that the breakage pieces of the waffle block do not jam between the coils of the spiral tracks. For the same reasons the width of the spiral tracks 11, i.e., width dimension of the rod-like element of each coil taken in a direction parallel to the upper surface of the feeder conveyor, should also be between one hundredth and one twentieth of the average diameter of the spiral track, and the effective part of the spiral tracks 11, i.e. the part thereof which projects over the transport plane of the feeder belt consists of only one to one and a half windings, wherein the upper end of the spiral track 11 is flattened out.

In order to give more support to the spiral tracks 11, they are provided at the portion located outside the actual stacking area with one or more vertically extending accuate guides. In this regard, it will be apparent from the drawing that the spiral tracks 11 each have an inner portion for engagement with the waffle sheets, the inner portions of the pair of spiral tracks facing each other, and an outer portion which does not engage the waffle sheet, the outer portions of the pair of helical tracks facing away from each other.

As indicated previously, the light gate 10 and the counting mechanism regulates the actuation of the abutment 21. Thus, the light gate 10 is part of the discharge controlling means for the stacking device. As also indicated, the light gate 10 is also involved in regulating the intermittent driving of the spiral tracks 11. Thus, the light gate 10 is also part of an overall means for intermittently operating the helical tracks. The driving arrangements of the feeder conveyor and spiral tracks are such that a circumferential speed of each spiral track is established which is approximately double a certain given speed at which the belt of the feeder conveyor is driven. In this regard, the speed of the spiral tracks is between 60 and 80 r.p.m. In additional, the speeds of the feeder conveyor and of the run-off conveyor are such that the speed of the feeder conveyor is approximately 25% lower than the speed of the run-off conveyor. These guides can be formed either of a ring and slit 27 which are semi-circular in cross section, the cross-section of course being taken in a plane parallel to the upper surface of the feeder conveyor or from several guide elements or rails 28 arranged in the circumferential direction of the spiral track 11 alternately inside or outside the circle described thereby, or from rotably mounted rolls. The wall portions defining the slot 27, and the rails or rolls 28 can be appropriately adjustable separately from each other relative to to the spiral tracks 11. The starting of the motors 14 of the spiral tracks 11 is obtained by the same light gate 10 which controls also the lowering of the feeder belt 2.

An abutment 21 consisting of one or more fingers 20 secured to a plate 30 is arranged directly behind the spiral tracks 11. The waffle sheets 7 slide along this abutment 21 during their upward movement through the spiral tracks 11. As soon as the desired number of waffle sheets 7 set on the counting mechanism has been assembled in the stacking device 3 the abutment 21 slidably mounted on vertical guide rods 15 is lowered. When the second waffle sheet 7 of the following waffle block passes the light gate 10 the spiral feeders 11 are started again and a delay member is activated which after run-off lifts the abutment 21 by one step. In this manner the spiral tracks push, simultaneously with the lifting of the first waffle sheet 7 of the following waffle block, the finished waffle block to the run-off belt 4 which reaches directly to the abutment 21. After the spiral feeders 11 have completed their revolution the abutment returns to its upper end position. In this manner it is avoided that the waffle sheets to be assembled for the new waffle block leaves the stacking device prematurely.

The two-stage return of the abutment 21 into its starting position is required because simultaneously with the removal of the finished waffle block from the stacking device 3 the cover sheet of the following stacking block is moved upwardly therein, and if the abutment 21 were not present at the rear side of the stacking device 3 it would be transferred to the run-off belt. If the abutment returned immediately to its starting position it would follow that the points of fingers 20 of the abutment 21 would slide along the lowermost waffle sheet of the waffle block being removed and would damage it.

The pushing out of the waffle block is carried out by the spiral tracks 11 themselves as well as by the guides or auxiliary devices disposed on the inside of the spiral tracks 11, as well as the run-off belt 4. These auxiliary devices consist of guide rolls 23 which grip the waffle sheets or waffle block at the edges which rotate about vertical axes and which are parallel to the feeder direction of the belts 2 and 4 to guide the waffle sheets or waffle blocks in the downstream direction, generally in a horizontal plane parallel to the upper surface of the feeder conveyor. The shafts 26 supporting the spiral tracks 11 are also formed as guide rolls. In this way it is assured that the finished waffle block has already left the stacking device 3 before the first waffle sheet and the following waffle block reaches the uppermost position in the stacking device.

The actuation of the abutment 21 is obtained by means of a compressed air cylinder 24 which engages at the plate 30, and which is also regulated by the light gate 10 and the counting mechanism.

The drive of the guide rolls 23 is obtained from shaft 26 of the spiral track 11 over V-belts or round belts 17. The guide rolls 23 of the auxiliary device, which stand still when the waffle sheets are fed in, have also the task of assuring the exact proper positioning of the individual waffle sheets relative to each other, as well as assisting the stacking device 3 during the removal of the waffle block therefrom. However, it is possible to provide a drive of the guide rolls 23 which is independent of the drive for the spiral tracks 11, whereby they are able to assist the feeder belt 2 when bringing in the waffle sheet 7 into the stacking device 3.

The shafts of the guide rolls 23 are mounted at their upper end in a gallows-type console 18. Each of the guide rolls 23, as well as the shaft 26 supporting the spiral track 11, has associated therewith a scraper 19 in order to prevent the accumulation of cream escaping sideways from the waffle block on the guide roll 23 or shaft 26. The spiral tracks 11 do not require any scrapers as the spirals clean themselves automatically due to the relative movement with respect to the waffle sheets. The two guide rolls 23 can also constitute deflecting rolls for a feeder belt which could fulfil the same functions.

The operation of the apparatus according to the invention will be described now with reference to the manufacture of a five layer waffle block. As soon as the first waffle sheet passes the light gate 10 the control will switch on the motor of cam 9 and the frame with the feeder belt 2 is lowered, so that the waffle sheet passes uncoated below the cream coating device. The light gate 10 actuates simultaneously the drive for the spiral tracks 11. Thereby the last waffle sheet of the waffle block is lifted up and placed from below against the already assembled waffle sheets so that the waffle block is now complete. In this regard, it will be apparent that each waffle sheet after the uncoated sheet (including the last) has been lifted up from below to join the waffle sheet or sheets above it. Obviously, when a waffle sheet reaches the aforementioned upper flattened out portion of the spiral track it will go no higher. In the meantime, however, another sheet will enter the spiral track and rise. It will be readily apparent that when this latter sheet reaches the upper part of the spiral track it will meet with and join the aforementioned other sheet at the upper flattened part. After the spiral tracks 11 have gone through a complete revolution, the control switches turn off the drive 14 of the spiral tracks 11. The uncoated waffle cover sheet of the following waffle block is inserted into the thus free lower coil of the spiral tracks 11. Simultaneously the abutment 21 is lowered by two steps in such a way that the fully assembled waffle block is released but that the subjacent first waffle sheet of the following waffle block strikes against the abutment 21. When the second waffle sheet passes the light gate 10 the feeder belt 2 is not lowered and so this waffle sheet is coated at its upper side with cream in the cream coating device 6.

As soon as the spiral tracks 11 commence to rotate they slide the finished waffle block by means of the guide rolls 23 on the run-off belt 4 and feed the subjacent uncoated waffle sheet 7 of the following waffle block upwardly. In other words, the same spiral action effects both raising of first waffle sheet of the new block and discharge of the finished block from the stacking device without a separate lowering action. In the meantime the abutment 21 goes up by one step. The second waffle sheet coated during this time is inserted into the thus free lower coil of spiral tracks 11. Furthermore the abutment is lifted to the second step.

When the third waffle sheet passes the light gate 10 the drive of the spiral tracks 11 is switched on again and the second waffle sheet is lifted and placed from below against the waffle cover sheet. During this time the third waffle sheet is coated and is inserted into the again free lower coil of the spiral tracks 11. This procedure is repeated corresponding to the desired number of sheets of the waffle block so many times until the last coated waffle sheet of the waffle block is located on the lower coil of the spiral tracks 11. In the case of a five-layer waffle block thus two more times. Thereafter the entire process starts over again.

What is claimed is:

1. An apparatus for manufacturing waffle blocks having layers of waffle sheets, the waffle sheets having upper and lower sides, the apparatus comprising:
   a feeder conveyor for moving waffle sheets in a downstream direction;
   a cream coating device disposed adjacent said feeder conveyor for coating the upper sides of at least certain of the waffle sheets with cream prior to entry of the waffle sheets into the stacking device;
   a stacking device disposed adjacent to and generally downstream of said feeder conveyor for receiving waffle sheets, at least some of which are cream coated, from said feeder conveyor for stacking the waffle sheets vertically one under the other to form a sandwich-like waffle block in which cream layers are interposed between the waffle sheets;

a run-off conveyor disposed downstream of said stacking device for receiving completed sandwich-like waffle blocks discharged from the stacking device and for transporting such waffle blocks away from the stacking device;

said stacking device including means for: vertically lifting a first waffle sheet, received from said feeder conveyor, above said feeder conveyor; for joining, by means of the stacking device, a second cream coated waffle sheet to the first waffle sheet to form at least a partial cream and waffle sandwich block by vertically lifting the second cream-coated waffle sheet, received from said feeder conveyor after receipt of said first waffle sheet, above said feeder conveyor to meet the lower side of the first lifted sheet; and for vertically lifting, if additional layers are desirous, additional cream-coated sheets, received from said feeder conveyor after receipt of said first and second sheets, above said feeder conveyor to meet the lower side of the last previously lifted sheet to provide a completed cream and waffle sandwich block; and means for controlling discharge of the completed waffle blocks from the stacking device.

2. An apparatus according to claim 1 including:
means for controlling said cream coating device to prevent coating of the first waffle sheet to be received in the stacking device for forming a given waffle block so that only the second and any subsequent waffle sheets for a given waffle block are coated.

3. An apparatus according to any one of claims 1 or 2, wherein said discharge controlling means includes an abutment disposed immediately downstream of said stacking device to provide a stop for each waffle sheet to prevent discharge thereof from said stacking device during stacking, said abutment also providing an end guide for aligning said waffle sheets during stacking.

4. An apparatus according to claim 3, wherein said abutment is vertically movable between an upper discharge blocking position, in which the waffle sheets in said stacking device engage the abutment, and a lower discharge position, in which the waffle sheets in the stacking device do not engage the abutment and in which the completed waffle block is free to move downstream, said vertical movement of said abutment being over a distance corresponding to the vertical height of a completed waffle block.

5. An apparatus according to claim 1, further including means for running said feeder conveyor and said run-off conveyor at speeds such that the speed of said feeder conveyor is approximately 25% lower than the speed of said run-off conveyor.

6. An apparatus for manufacturing waffle blocks having layers of waffle sheets, the waffle sheets having upper and lower sides, the apparatus comprising:
a feeder conveyor for moving waffle sheets in a downstream direction;
a stacking device disposed adjacent to and generally downstream of said feeder conveyor for receiving waffle sheets from said feeder conveyor; for stacking the waffle sheets vertically one under the other to form a waffle block;

a run-off conveyor disposed downstream of said stacking device for receiving completed waffle blocks discharged from the stacking device and for transporting such waffle blocks away from the stacking device;

said stacking device including means for: vertically lifting a first waffle sheet, received from said feeder conveyor, above said feeder conveyor; for vertically lifting a second waffle sheet, received from said feeder conveyor after receipt of said first waffle sheet, above said feeder conveyor to meet the lower side of the first lifted sheet; for vertically lifting, if additional layers are desired, additional sheets, received from said feeder conveyor after receipt of said first and second sheets, above said feeder conveyor to meet the lower side of the last previously lifted sheet to provide a completed waffle block;

means for controlling discharge of the completed waffle blocks from the stacking device;

said stacking device including a pair of vertical feeders for engaging and vertically raising the waffle sheets to effect stacking thereof;

said waffle sheets having lateral sides running in generally the downstream direction and wherein said pair of vertical feeders are disposed adjacent each other such that, in operation, one vertical feeder is on one lateral side of a waffle sheet to be lifted and the other vertical feeder on the other lateral side of the waffle sheet to be lifted;

said vertical feeders comprising rotatable helical tracks in the form of coiled rod-like elements, said helical tracks providing an upward spiral movement, said helical tracks having axes of rotation; and means for rotatably driving said helical tracks in opposite rotary directions relative to one another.

7. An apparatus according to claim 6, wherein said helical tracks each are made of bent round spring steel.

8. An apparatus according to claim 6, wherein said helical tracks each have an average diameter, each said average diameter being approximately equal to the length of each waffle sheet taken in the downstream direction.

9. An apparatus according to claim 6, wherein each helical track comprises a coil with only two turns, said feeder conveyor having an upper surface on which said waffle sheets are carried, an upper portion of each coil being disposed at a level above said upper surface of said feeder conveyor, each such upper coil portion comprising between one turn and one and one-half turns of the coil.

10. An apparatus according to claim 9, wherein said helical tracks each have an inner portion for engagement with the waffle sheets, said inner portions of the pair of helical tracks facing each other, and an outer portion which does not engage the waffle sheet, the outer portions of the pair of helical tracks facing away from each other, said stacking device including vertically extending arcuate guides for guiding the movement of said helical tracks.

11. An apparatus according to claim 10, wherein each arcuate guide includes a ring having a semi-circular cross-section taken in a plane parallel to said upper surface of said feeding conveyor.

12. An apparatus according to claim 10, wherein said coiled rod-like element of each helical track describes a circle when viewed in a direction along the axis of rotation of said spiral track and wherein each arcuate guide includes a plurality of guide elements, said guide elements being disposed alternately inside and outside said circle.

13. An apparatus according to claim 10, wherein said arcuate guides are movably adjustable with respect to said helical tracks.

14. An apparatus according to claim 9, wherein said helical tracks include vertically disposed shafts through which their axes of rotation extend, said spiral tracks having lower parts which extend below said upper surface of said feeder conveyor, said spiral tracks being mounted in place on an arm which extends diametrically with respect to said spiral tracks and which is coupled with said shafts thereof at said lower parts thereof.

15. An apparatus according to claim 14, wherein a vertically disposed lateral guide for said waffle sheets is disposed within each helical track.

16. An apparatus according to claim 15, wherein said lateral guides include said vertically disposed shafts.

17. An apparatus according to claim 15, wherein each vertical guide is engaged by a scraper to clean said guide during operation.

18. An apparatus according to claim 15, wherein said lateral guides include at least two rolls which rotate about vertical axes, said rolls being engageable with the lateral sides of the waffle sheets to guide the same in the downstream direction on a plane parallel to said upper surface of said feeder conveyor.

19. An apparatus according to claim 18, wherein one of said rolls for each helical track comprises said vertically disposed shaft thereof.

20. An apparatus according to claim 18, wherein said rolls are rotatably driven to aid in propelling completed waffle blocks from said stacking device during discharge.

21. An apparatus according to claim 6, wherein the rod-like element of each coil has a width dimension taken in a direction parallel to said upper surface of said feeder conveyor, said width dimension being equal to between 1/100 and 1/20 of said average diameter of each spiral track.

22. An apparatus according to claim 6, wherein the rod-like element of each coil has a thickness dimension taken in the vertical direction in which the waffle sheets are raised and wherein the distance between two adjacent turns of each coil taken in said vertical direction is between 2.5 and 4 times said thickness dimension.

23. An apparatus according to claim 6, wherein said feeder conveyor includes a belt driven at a given speed and wherein said driving means for said helical tracks includes means for establishing a circumferential speed of each coil which is approximately double said given speed of said belt.

24. An apparatus according to claim 23, wherein said establishing means is a means for establishing a rotational speed of said spiral tracks of 60–80 revolutions per minute.

25. An apparatus according to claim 6, wherein said helical tracks are each coated with a synthetic material.

26. An apparatus according to claim 6, wherein said vertical feeders are disposed at the sides of the feeder conveyor.

27. An apparatus according to claim 6, wherein said vertical feeders are disposed in an extension of the feeder conveyor.

28. An apparatus for manufacturing waffle blocks having layers of waffle sheets, the waffle sheets having upper and lower sides, the apparatus comprising:
a feeder conveyor for moving waffle sheets in a downstream direction;
a stacking device disposed adjacent to and generally downstream of said feeder conveyor for receiving waffle sheets from said feeder conveyor for stacking the waffle sheets vertically one under the other to form a waffle block;
a run-off conveyor disposed downstream of said stacking device for receiving completed waffle blocks discharged from the stacking device and for transporting such waffle blocks away from the stacking device;
said stacking device including means for: vertically lifting a first waffle sheet, received from said feeder conveyor, above said feeder conveyor; for vertically lifting a second waffle sheet, received from said feeder conveyor after receipt of said first waffle sheet, above said feeder conveyor to meet the lower side of the first lifted sheet; and for vertically lifting, if additional layers are desired, additional sheets, received from said feeder conveyor after receipt of said first and second sheets, above said feeder conveyor to meet the lower side of the last previously lifted sheet to provide a completed waffle block; and
means for controlling discharge of the completed waffle blocks from the stacking device;
said stacking device including a pair of vertical feeders for engaging and vertically raising the waffle sheets to effect stacking thereof;
said waffle sheets having lateral sides running in generally the downstream direction and wherein said pair of vertical feeders are disposed adjacent each other such that, in operation, one vertical feeder is on one lateral side of a waffle sheet to be lifted and the other vertical feeder on the other lateral side of the waffle sheet to be lifted;
said vertical feeders comprising rotatable helical tracks, said helical tracks providing an upward spiral movement;
each helical track comprising a coil with only two turns, said feeder conveyor having an upper surface on which said waffle sheets are carried, an upper portion of each coil being disposed at a level above said upper surface of said feeder conveyor, each such upper coil portion comprising between one turn and one and one-half turns of the coil.

29. An apparatus for manufacturing waffle blocks having layers of waffle sheets, the waffle sheets having upper and lower sides, the apparatus comprising:
a feeder conveyor for moving waffle sheets in a downstream direction;
a stacking device disposed adjacent to and generally downstream of said feeder conveyor for receiving waffle sheets from said feeder conveyor for stacking the waffle sheets vertically one under the other to form a waffle block;
a run-off conveyor disposed downstream of said stacking device for receiving completed waffle blocks discharged from the stacking device and for transporting such waffle blocks away from the stacking device;
said stacking device including means for: vertically lifting a first waffle sheet, received from said feeder conveyor, above said feeder conveyor; for vertically lifting a second waffle sheet, received from said feeder conveyor after receipt of said first waffle sheet, above said feeder conveyor to meet the lower side of the first lifted sheet; and for vertically lifting, if additional layers are desired, additional sheets, received from said feeder conveyor after receipt of said first and second sheets, above said feeder conveyor to meet the lower side of the last previously lifted sheet to provide a completed waffle block; and means for controlling discharge of the completed waffle blocks from the stacking device;

said discharge controlling means including an abutment disposed immediately downstream of said stacking device to provide a stop for each waffle sheet to prevent discharge thereof from said stacking device during stacking, said abutment also providing an end guide for aligning said waffle sheets during stacking;

said abutment being vertically movable between an upper discharge blocking position, in which the waffle sheets in said stacking device engage the abutment, and a lower discharge position, in which the waffle sheets in the stacking device do not engage the abutment and in which the completed waffle block is free to move downstream, said vertical movement of said abutment being over a distance corresponding to the vertical height of a completed waffle block.

30. An apparatus according to claim 29, including means for also moving said abutment into an intermediate vertical position between said upper and lower positions, in which intermediate position the abutment blocks the discharge from the stacking device of a first waffle sheet for a new waffle block prior to complete discharge from the stacking device of a previously completed waffle block.

31. An apparatus according to claim 29, wherein said abutment is also moved into an intermediate vertical position between said upper and lower positions, in which intermediate position the abutment blocks the discharge from the stacking device of a first waffle sheet for a new waffle block prior to complete discharge from the stacking device of a previously completed waffle block.

32. An apparatus according to claim 29, wherein said driving means for said helical tracks includes means for operating said helical tracks intermittently.

33. An apparatus according to claim 32, wherein said discharge controlling means includes a light gate disposed upstream of said stacking device for sensing the position of a waffle sheet, said light gate being operatively coupled with said abutment for initiating lowering thereof, said light gate also being operatively coupled with said driving means, said means for intermittently operating said helical tracks also including said light gate.

* * * * *